UNITED STATES PATENT OFFICE.

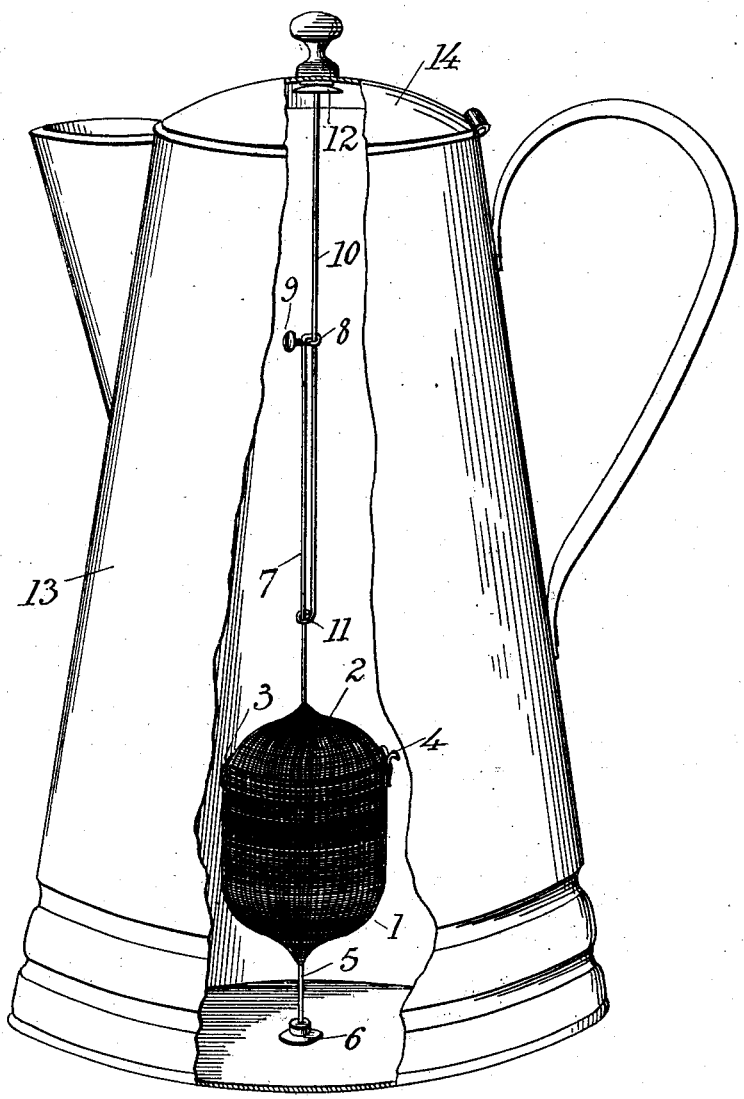

JOSHUA C. SENEY, OF WAXAHACHIE, TEXAS.

PERCOLATOR.

SPECIFICATION forming part of Letters Patent No. 693,913, dated February 25, 1902.

Application filed March 21, 1901. Serial No. 52,236. (No model.)

*To all whom it may concern:*

Be it known that I, JOSHUA C. SENEY, a citizen of the United States, residing at Waxahachie, in the county of Ellis and State of Texas, have invented a new and useful Percolator, of which the following is a specification.

This invention relates to tea and coffee pots, and has for its object to provide improved means for containing the tea and coffee, so that the same may be conveniently steeped without being loose within the body of the pot. It is furthermore designed to arrange for facilitating the application and removal of the device and also to have the same adjustable, so as to be conveniently fitted to pots of different sizes and also to be held against displacement by the lid of the pot.

With these and other objects in view the present invention consists in the combination and arrangement of parts, as will be hereinafter more fully described, shown in the accompanying drawing, and particularly pointed out in the appended claims, it being understood that changes in the form, proportion, size, and minor details may be made within the scope of the claims without departing from the spirit or sacrificing any of the advantages of the invention.

In the drawing there has been illustrated a perspective view of a pot with a portion of one side broken away to show the improved percolator mounted within the pot.

In carrying out the present invention there is provided a perforated body portion 1, preferably formed of foraminous material and provided with a similar lid or cover 2, which is hinged to the open top of the body, as indicated at 3, and having a spring-catch 4, located opposite the hinge and for holding the lid closed tightly down upon the body. From the center of the bottom of the body there depends a leg 5, which is provided at its lower extremity with an enlarged foot 6, upon which the device is designed to be supported. Rising from the top and at the center of the lid is a rod 7, which is provided at its upper end with a loop or ring 8, that is offset or disposed at one side of the rod and carries a set-screw 9, that pierces one side of the ring, so that its inner end may enter the space bounded by the loop or ring. Another rod 10 has its intermediate portion slidably inserted through the ring or loop and is provided at its lower end with a terminal loop or ring 11, that slidably embraces the former rod, thereby forming a telescopically-jointed handle for the percolator. The upper terminal of the upper rod-section is provided with a convex button or head 12.

In using the present device it is placed within the body of a coffee or tea pot 13, after which the upstanding rod is adjusted so that when the lid 14 of the pot is closed it will bear firmly downwardly upon the head or button 12, so as to hold the percolator at the axial center of the pot. It is preferable to have the supporting-leg comparatively short, so that the body of the device may lie near the bottom of the pot in order that small as well as large quantities of tea and coffee may be made.

It will be noted that the set-screw is designed to fixedly connect the telescopic handle members after they have been adjusted to accommodate the upper end of the handle to the lid of the pot, whereby the device is applicable to pots of different heights. Moreover, there is no change required in the pot, it being merely necessary to open the lid thereof, insert the device into the pot, adjust the handle to bring its upper end at or slightly above the top of the pot, and finally close the lid of the pot down firmly upon the top of the rod or handle. It will also be noted that the footpiece and body portion are rigidly connected and the handle-piece and lid are also rigidly connected, the lid and body being connected at one side by a hinge and at the opposite side by a spring-catch. The whole structure when the parts are closed is rigid and may be easily inserted in the pot when the latter is filled with water.

When the device is removed from the pot for cleansing purposes, the handle portion secured to the lid can be grasped in one hand and the foot portion, secured to the body of the device, may be grasped in the other hand, and by exerting slight force the spring-catch can be disengaged and the parts opened on the hinge, the cleansing being accomplished without the necessity of handling the percolator proper.

The device may remain within the pot after the tea or coffee has been made, as it does not interfere with the pouring out of the contents of the pot, and, if preferred, the percolator may be removed by raising the lid of the pot and withdrawing the percolator by means of its handle. All of the parts are accessible for cleansing, whereby the percolator presents a sanitary device.

What is claimed is—

In a device of the class specified, a foraminous vessel comprising a body and a lid hinged thereto, a spring-catch for holding the two in locked position, a supporting-leg rigidly secured to the bottom of the body, and a lifting-handle rigidly secured to the upper portion of the lid, the whole structure when closed being rigid and adapted for ready insertion into a pot or other vessel, substantially as specified.

In testimony that I claim the foregoing as my own I have hereto affixed my signature in the presence of two witnesses.

JOSHUA C. SENEY.

Witnesses:
WALTER A. CROW,
O. H. CHAPMAN.